United States Patent [19]

Broussaud et al.

[11] 4,337,484
[45] Jun. 29, 1982

[54] APPARATUS FOR THE TRANSCRIPTION OF A VIDEO DISK ONTO A CENEFILM

[75] Inventors: Georges Broussaud; Claude Tinet, both of Paris, France

[73] Assignee: Thomson-CSF, Paris, France

[21] Appl. No.: 82,321

[22] Filed: Oct. 5, 1979

[30] Foreign Application Priority Data

Oct. 11, 1978 [FR] France .................... 78 28984

[51] Int. Cl.³ .................. H04N 5/76; H04N 5/88
[52] U.S. Cl. .................. 358/128.6; 358/131; 358/244
[58] Field of Search .................. 358/127–132, 358/244, 140, 4–8; 360/9–11, 35, 33; 179/100.1 G, 100.3 V; 369/109, 111, 44–46

[56] References Cited

U.S. PATENT DOCUMENTS

| 2,816,157 | 12/1957 | Andreas et al. | 358/131 |
| 3,317,663 | 5/1967 | Van Dam | 358/244 |
| 3,352,968 | 11/1967 | Walter et al. | 358/244 |
| 3,366,753 | 1/1968 | Frohbach | 179/100.3 V |
| 3,571,503 | 3/1971 | McMann, Jr. | 358/130 |
| 3,723,647 | 3/1973 | John, Jr. | 358/131 |
| 3,752,906 | 8/1973 | Lowry | 358/6 |
| 3,854,015 | 12/1974 | Janssen | 179/100.3 V |
| 4,096,530 | 1/1978 | Plugge et al. | 358/244 |
| 4,145,710 | 3/1979 | Venis | 360/9 |
| 4,148,077 | 4/1979 | Bragus | 358/140 |
| 4,214,268 | 7/1980 | Keznickl et al. | 358/127 |

FOREIGN PATENT DOCUMENTS

| 2809490 | 9/1978 | Fed. Rep. of Germany | 358/128.5 |
| 2839248 | 3/1979 | Fed. Rep. of Germany | 358/244 |

Primary Examiner—Raymond F. Cardillo, Jr.
Attorney, Agent, or Firm—Cushman, Darby & Cushman

[57] ABSTRACT

An apparatus in which the video disk frames are reread while a shutter blocks the film in order to have during the rereading operation the time necessary for advancing the kinescope film without causing violent mechanical stresses. In order to pass from the television standard with 30 frames per second to the cinematographic standard of 24 frames per second, one frame out of five is not recorded on the film and the film advanced without any rereading.

5 Claims, 8 Drawing Figures

APPARATUS FOR THE TRANSCRIPTION OF A VIDEO DISK ONTO A CENEFILM

BACKGROUND OF THE INVENTION

The present invention relates to processes for transcribing a video disk onto a cine film. The term video disk, which is now in standard use, is used to describe disks carrying the recording of television signals.

Such disks and apparatus permitting the recording and reading thereof, generally optically, are known. The most widely used method consists of recording television signals, suitably coded in the form of a series of lines of variable length and spacing distributed along a spiral path centered on the centre of the disk. To read the disk, the reading head is moved radially by a lead screw for example. This reading head comprises an optical device permitting the illumination of the path and the collection of the changes in the light beam made by the inscribed lines. As the path is very narrow and the spiral very tight (of the order of a few microns) this optical device generally has tracking servomechanisms, permitting, for example by means of an oscillating mirror, the tracking of the path in spite of the irregularities of varying magnitude and types, such as the eccentricity of the disk and irregularities of the lead screw.

In conventional manner, two fields, corresponding to a single frame, are recorded for each rotation of the disk and this fixes the rotation speed of the said disk, because the duration of one frame is standardized and must be respected in order to be able to provide a television set with the appropriately decoded reading signals. The motor which radially drives the reading head is controlled by the mean value of the error voltage of the tracking servomechanism. Thus, on normally reading the disk, the head advances at the average speed of one path per revolution. If, however, an acceleration or deceleration is required, a pulse is applied to the tracking servomechanism in order to jump a turn, forwards or backwards depending on the particular case, at the end of a frame. This changes the average value of the error voltage and the radial advance motor is automatically adjusted to the necessary speed. On systematically rereading the same frame, the motor stops and stoppage takes place on a fixed frame.

In addition, prior to the invention of the magnetoscope, kinescopes were used which made it possible to film the screen of a receiver in order to be able to store transmissions.

In the kinescope it was necessary to synchronize the cine camera used with the passage of the frames on the receiver screen. This required a very slight increase in the shooting speed compared with a normal camera (25 instead of 24) in the case of European standards and the elimination of one frame out of five in the case of U.S. standards with 30 frames per second.

However, in all these cases, it was necessary to obtain a very great reduction time required to move the film so the film could be moved during a field return time, i.e. approx. 1.6 ms. Although such characteristics were obtained, the cameras were very cumbersome, sensitive and unreliable, so that this process has been neglected.

Although the magnetic tape of a magnetoscope is satisfactory, it is still cumbersome, expensive and liable to deteriorate in time, so that on the basis of these criteria, it is comparable to film.

However, the disk is compact, inexpensive and can be stored almost indefinitely. It has therefore been envisaged to use it for replacing, or at least for keeping a duplicate of films whose storage takes up a great deal of space when kept for a long period.

However, it has been considered desirable to be able to transcribe these video disks into films during a subsequent use in order to be able to utilize cine projection equipment which is widely available, which is not the case with large screen television projection equipment. Thus, interest again exists in the kinescope with the technical limitations described hereinbefore.

BRIEF SUMMARY OF THE INVENTION

The invention relates to an apparatus comprising a videoscope reader associated with a camera via means which make it possible to overcome the said technical limitations and to use a standard quality cine camera, whilst making it possible to change standard as is necessary on passing through from 30 to 24 frames per second.

For this purpose, each frame is reread once for three frames and then two frames are read normally. Thus, it is possible to operate the camera shutter during these three rereadings and the reading of the last image of said group of five, making it possible to slowly advance the film in the camera by means of a simple, robust mechanism.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
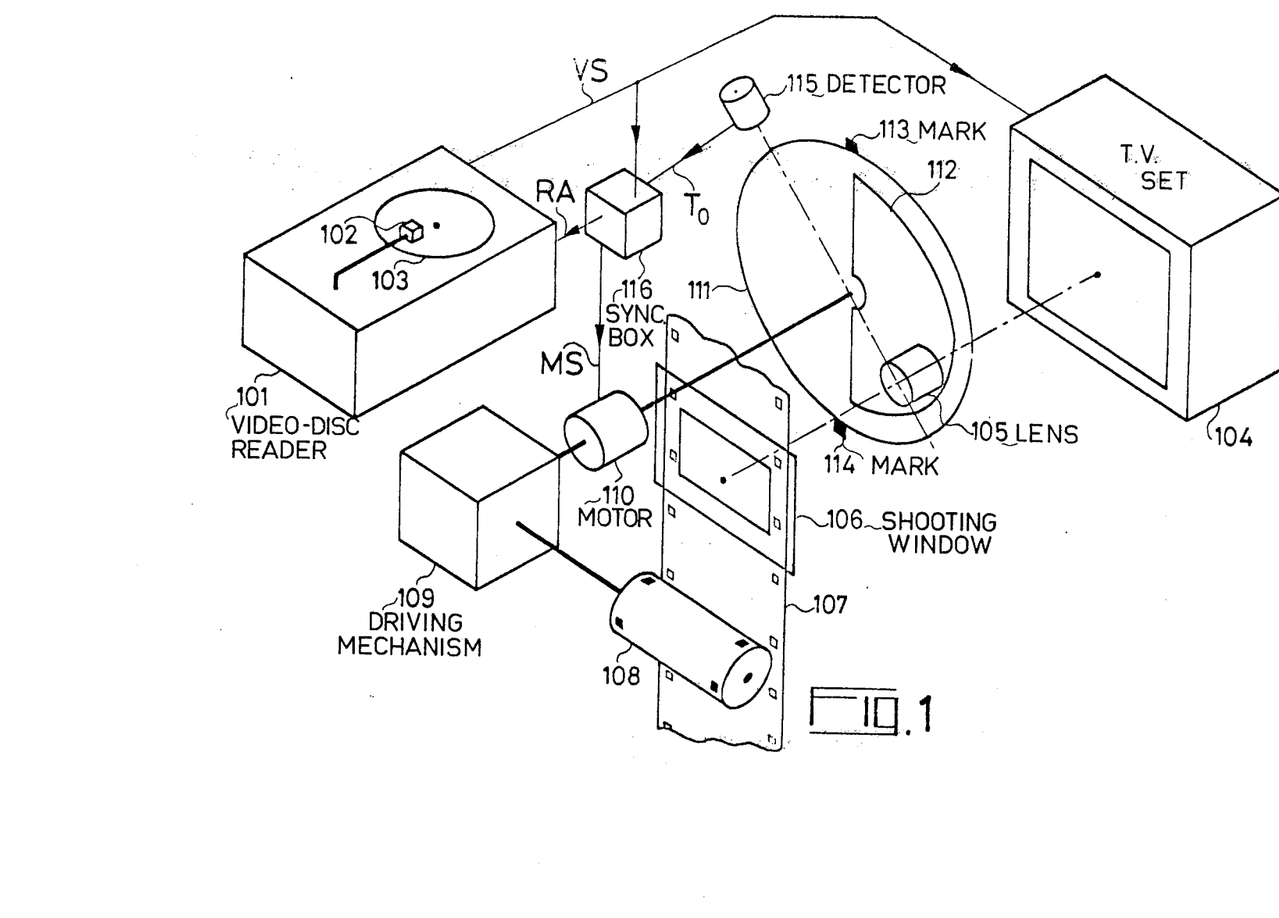
FIG. 1 a diagram of an apparatus permitting the transfer of a video disk onto a film.

The apparatus which is partly shown in FIG. 1 comprises a standard video disk reader 101 having an image rereading control system. This reader makes it possible to read a video disk 103 with a reading head 102. The reading signals from the reader are advanced to a standard television set 104 by a connection VS.

The television screen is filmed by a cine camera of which only those parts essential for the understanding of the invention are shown. Thus, a lens 105 forms the image of the screen on a shooting window 106 which enables an image to be produced on film 107.

This film is given a jerky movement by a sprocket 108 operated by a mechanism 109, e.g. of the maltese cross type, driven by a motor 110.

Motor 110 also drives a rotary shutter 111 in the form of a disk which covers the lens 105 during the advance of the film and uncovers it by means of a gate 112, which in the presently described example forms a sector occupying half the shutter disk.

The shutter has two positioning marks 113 and 114 which cooperate with a positioning detector 115 for supplying signals indicating the state of the covering of lens 105 by shutter 111 to a connection TO from the said detector. This association of mark and detector can be realised in several different ways, e.g. magnetized marks and an electromagnetic detector or opaque marks and an electrooptical detector. The spatial positioning shown in the drawing, i.e. the marks positioned on the diameter of the shutter defining gate 112 and the detector on an axis passing through the centre of the shutter and coplanar with the optical axis of the lens is the most natural, but it is possible to move both the marks and the detector with respect to these positions, whilst retaining the time positioning of the signals on TO.

Connection TO passes to a synchronizing box 116, which also receives a branch of connection VS. The circuits obtained in box 116 firstly make it possible to select the synchronization signals and the uneven field, corresponding to the start of an image analysis. By means of logic processing, the signals permitting the definition of the desired sequence are selected and the resultant signal is applied to the rereading control of reader 101 by connection RA which brings about a rereading of certain images. Thus, reading head 102 advances more rapidly than is necessary, said effect being compensated by the tracking servomechanism which displaces the reading beam in the direction opposite to the advance of the head. As the head advance speed is in per se known manner subject to the control of the mean value of the displacement of the tracking servomechanism, it automatically brings said advance speed to a correct value. It is sufficient to ensure that the dynamics of said servomechanisms are sufficient and to then regulate the same as required.

The circuits in box 116 also make it possible to compare the phase of the covering or masking signals supplied by detector 115 with the odd field. The error signal obtained in this way is applied to motor 110 by connection MS, making it possible to maintain the synchronism between the covering of lens 105 and the end of the frame.

Figure 2:
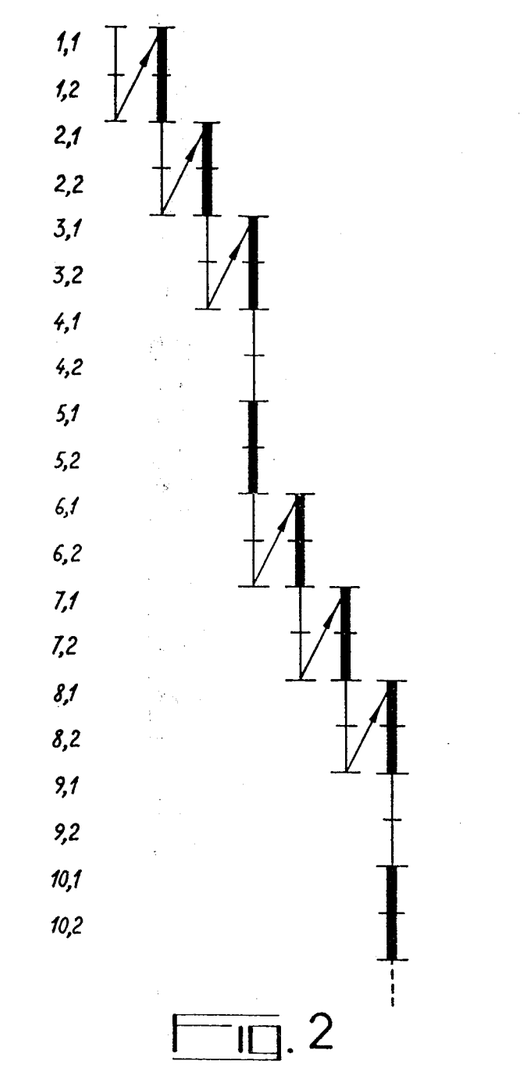
FIG. 2 shows a first transfer sequence.

FIG. 2 symbolically shows the succession of phases in the reading on the disk and the recording of ten successive frames on the film. These images are marked by groups of FIGS. 1.1 to 10.2 on the left-hand side of the drawing, the first figure in a group indicating the frame number and the second figure in the group indicating the field number in the frame.

The vertical lines represent normal readings on the disk and oblique lines with an arrow jumps in the path. The large horizontal lines indicate the starts of odd fields and the small horizontal lines the starts of even fields.

The closure of shutter 111 is indicated by the increased thickness of a vertical line representing a frame. Thus, on starting from frame 1, the shutter is open during the reading (33.3 ms) of this frame and closes at the end of field 1.2. At the first finish of field 1.2 the reader receives a signal via connection RA and the reading beam jumps backwards by one turn on the disk to return to the start of field 1.1. This jump is really extremely short and is approximately equivalent to a line (64 ms) and is therefore completely invisible.

During the second reading of frame 1, the film advances and the 33.3 ms available for this permit a very gentle movement of the film. At the second finish of field 1.2 the shutter opens making it possible to produce frame 2 on the film during the first frame thereof. The shutter closes at the end of field 2.2 and the film advances during the rereading of frame 2.

The same sequence takes place for frame 3, but then frames 4 and 5 are led in interconnection at the end of the second reading of frame 3 and without there being any rereading of same frames 4 and 5. Frame 4 is produced on the film in the normal way, but frame 5 is not produced, because the shutter is closed during the time that it is read.

At the end of field 5.2 the end of a complete transfer sequence is reached and a new sequence recommences by a first reading of frame 6 in the same way as the first reading of frame 1, after which the sequence is the same in the cases of images 6 to 10 as for images 1 to 5.

Figure 3:
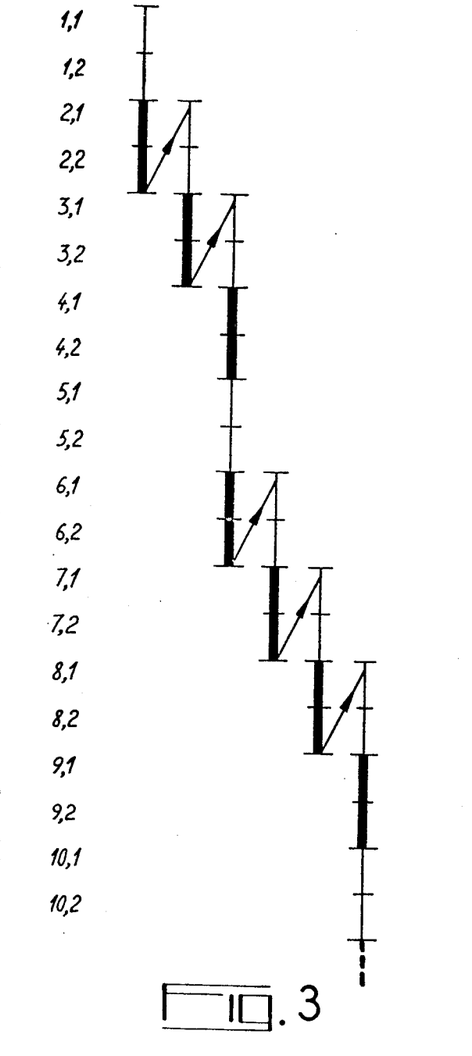
FIG. 3 shows a second transfer sequence.

It should be noted that in the example described, the reference marks 113 and 114 are not differentiated, so that during starting, the complete apparatus can start up in accordance with another cycle shown in FIG. 3 in which the reread frames are recorded on a film during their rereading. This sequence gives the same results as the other sequence and is fundamentally included within the scope of the invention.

Figure 4:
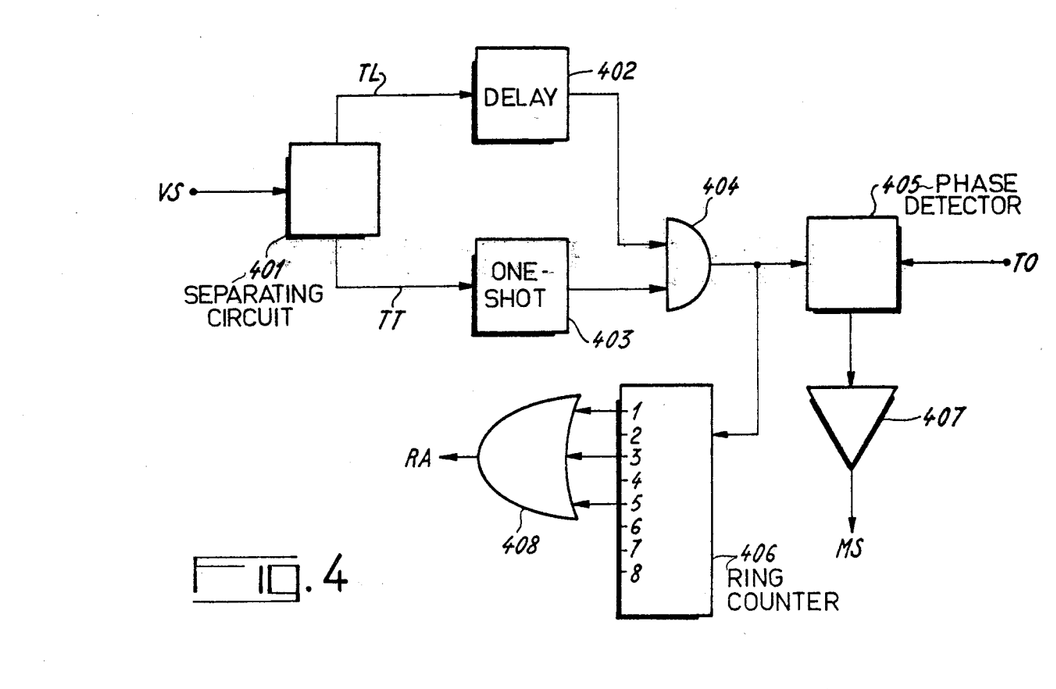
FIG. 4 shows one construction of member 116 in FIG. 1.

FIG. 4 shows a constructional embodiment of box 116.

By means of connection VS, the video signals reach a separating circuit 401 of the type conventionally used on television sets and which makes it possible to obtain line synchronization pulses on connection TL and field synchronization pulses on output TT. It is known that at the end of an even field, these pulses are substantially in phase and at the end of an odd field, they are separated by the duration of a half-line (32 $\mu$s). It is thus necessary to mark the coincidence of these pulses for the purpose of indicating the start of an odd field (which always follows an even field). To this end, the field pulse is widened by means of circuit 403, which is for example a monostable circuit so as to have a pulse which is sufficiently wide to eliminate scintillation effects, but which still lasts less than half a line, i.e. 15 $\mu$s for example. Furthermore, the line pulse is delayed slightly by a few $\mu$s by means of a delay network 402 in such a way as to be sure that the latter falls in thus widened field pulse. The outputs of circuit 402 and 403 are then applied to the AND gate 404, which supplies a pulse in the case of corresponding coincidence at the start of an odd frame.

The output of gate 404 is connected to a phase detector 405 which also receives the connection TO. The error signal supplied by said detector 405 is amplified by an amplifier 407 to a level which is sufficient for controlling the motor 110 by connection MS.

The output of gate 404 is also connected to a ring counter 406 which successively assumes eight states at the rhythm or rate of the pulses supplied by gate 404. In order to obtain the desired sequence, it is necessary for the rereading signal to be supplied during the appearance of states 1, 3 and 5 and for this the outputs 1, 3 and 5 of counter 406 are connected to the inputs of an OR gate 408, whose output is connected to the connection RA and transmits the necessary rereading signals.

The delay provided by network 402, which is slightly less than the duration of one line, is negligible because it falls within the field suppression gap.

In the embodiment described hereinbefore, the duration of one frame (33.3 ms) is available for moving the film. A 50% smaller time is completely adequate and would then correspond to the masking of the lens during the reading of a single field. Thus, in order to bring about a minimum disturbance of the representation of the movement, it will be possible to distribute in a less concentrated manner the field suppressed for the change of standard by using a cycle such as that shown in FIG. 5.

Figure 5:
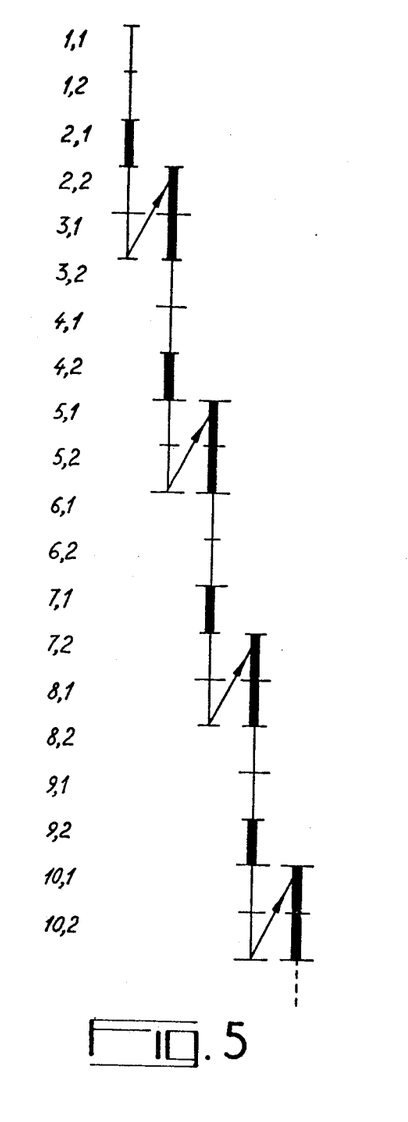
FIG. 5 shows a third transfer sequence.

In this cycle, frame 1 is firstly read with the shutter open. The shutter closes at the end of field 1.2 and remains cloed during the reading of field 2.1, so that no frame is produced on the film which advances by one frame during the duration (16.6 ms) of said field. The shutter opens at the end of field 2.1 and remains open during the first reading of fields 2.2 and 3.1. At the end of the first reading of field 3.1 the shutter closes and simultaneously fields 2.2 and 3.1 are reread in order to permit the advance of the film. Thus, the reading beam can jump backwards by one turn on the disk both during the frame return of half an frame and a complete frame, but it is always necessary to reread the two preceding fields completely. At the end of the second reading of field 3.1 the shutter opens and fields 3.2 and 4.1 and a single frame is produced on the film. Reading continues normally during fields 4.2 to 5.2 and the shutter closes during the reading of field 4.2 to permit the film to advance. Thus, field 4.2 is not transferred to the film which, taking account of the non-transfer of field 2.1, corresponds to the suppression of one field out of five necessary for the change of the standard. At the end of the first reading of field 5.2 the shutter closes and simultaneously fields 5.1 and 5.2 are reread in order to permit the advance of the film which completes the first cycle.

The cycle then recommences in the same way for fields 6.1 to 10.2.

Figure 6:
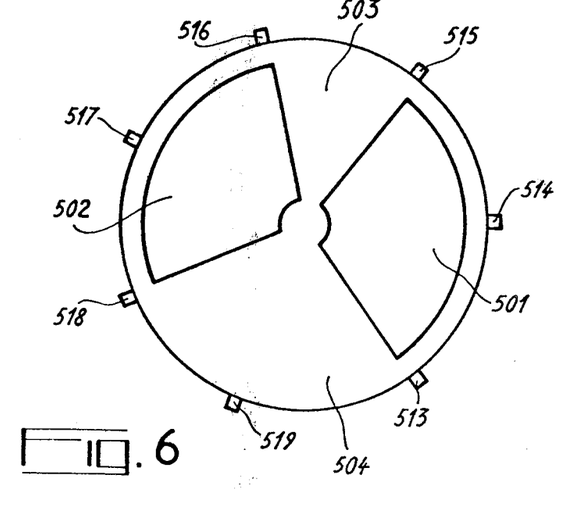
FIG. 6 shows a variant of shutter 111 of FIG. 1.

In order to obtain such a cycle, it is necessary to have a shutter differing from that of FIG. 1 and it is possible for example to use a shutter of the type shown in FIG. 6. This shutter is provided with two gates or windows 501 and 502 separated by two opaque sectors 503 and 504. The two gates each correspond to two fields and sector 503 to one frame, sector 504 to two fields. Thus, a rotation of the shutter corresponds to seven fields and therefore the gates measure two sevenths of the circle, sector 503 one seventh and sector 504 two sevenths. The shutter also has seven marks, 513 to 519 marking the transitions between the gates and the sectors and the centres of the gates and of sector 504.

Figure 7:
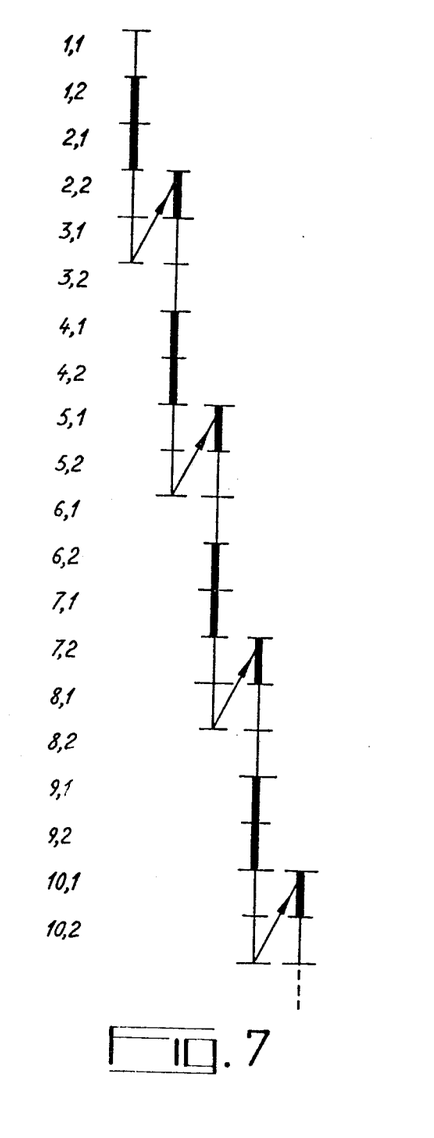
FIG. 7 shows a fourth transfer sequence.

Although it is possible to have cycle identical to that of FIG. 5 and permitting a correct transfer, if no special precautions are taken it is possible to have cycles such as that of FIG. 7 which do not permit such a correct transfer as a result for example of the suppression of one complete frame such as 4.1/4.2 and the repetition of the reading transfer of the same field such as 5.2.

Figure 8:
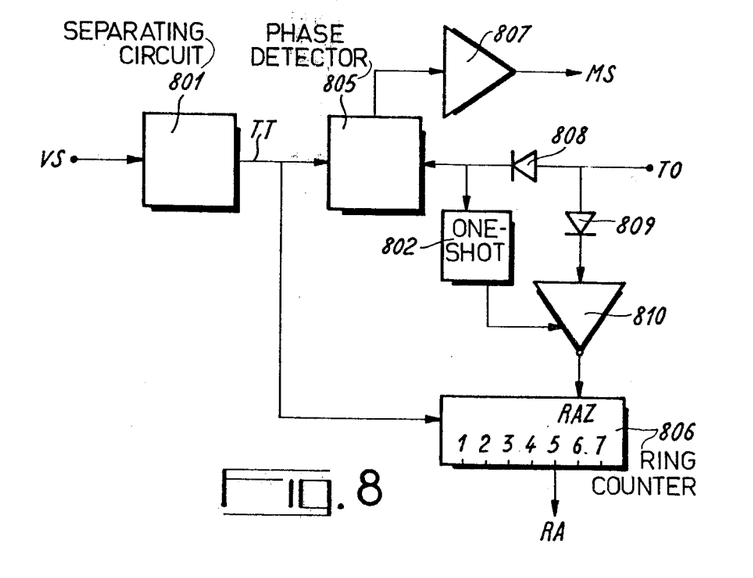
FIG. 8 shows a second construction of member 116 in FIG. 1.

In order to prevent this, it is necessary that at least one of the marks on the shutter produces a signal which is completely distinct from that given by the others. Thus, for mark 513 it is possible for example to use a piece magnetized in one direction and for marks 514 to 519 pieces magnetized in another direction. The pulses produced in detector 115 will then differ depending on whether they are produced by the passage of mark 513 or by the other marks. The differentiation between these pulses is effected in synchronizing box 116, an exemplified embodiment of which is shown in FIG. 8 and which is suitable for this transfer cycle.

By means of connection VS, the video signals are passed to a standard separating circuit 801 as used as television sets and which makes it possible to obtain field synchronization pulses on connection TT.

Output TT is connected to a phase detector 805 which also receives via a diode 808 signals from connection TO. This diode only permits the passage of positive signals and specifically one per mark. Thus, by passing in front of a coil such as 115 a magnet such as 513 to 519 induces in it a signal formed by a pulse in one direction followed by a pulse in the other direction. Furthermore, the dimensions of the magnet and the coil can be sufficiently small, so that the complete signal is of such a brief duration that no detectable error is introduced, no matter which method is used for detecting the signal. In the presently described example, marks 514 and 519 induce a positive pulse followed by a negative pulse and mark 513 a negative pulse followed by a positive pulse.

The error signal supplied by detector 805 is amplified by an amplifier 807 to a level sufficient for controlling motor 110 by means of connection MS.

Output TT is also connected to a ring counter 806 which successively assumes six states at the rhythm or rate of the pulses supplied by circuit 801. In order to obtain the desired sequence, it is necessary for the rereading signal to be supplied during the appearance of state 5 and for this purpose it is merely necessary to connect output 5 of the counter to the rereading control connection RA.

For the rereading control signal to be transmitted in such a way as to obtain the sequence of FIG. 5, counter 806 is systematically zeroed during the passage of mark 513 in front of detector 115. For this purpose, diode 809, connected in the opposite direction to diode 808, only permits the passage of negative signals which are then inverted in an amplifier which produces an output signal which is the inverted absolute value of the input signal. To obtain at the output of said amplifier a signal induced solely by mark 515 the output signals of diode 808 trigger a monostable circuit 802, which transmits a square-wave signal whose duration is greater than the gap between the negative and positive pulses due to the same mark. This square-wave signal is applied to a blocking control input of amplifier 810, so that when the positive pulse arrives first, the amplifier 810 is blocked and does not invert the negative pulse from diode 809. Conversely, when the negative pulse arrives first, amplifier 810 inverts it and implies it to the zeroing input RAZ of counter 806.

When the video disk operates at a normal speed of 30 frames per second, the transfer onto the film does not take place in real time because there is a repetition of frames. It is possible to have a shorter total transfer time by increasing both the reading speed of the video disk and the shooting speed of the camera within limits compatible with the satisfactory operation of the latter. It is then necessary to especially regulate the reading and decoding circuits of the video disk reader because the carrier frequencies used are displaced upwards. Such a regulation or setting causes no particular difficulties.

The invention is extended to apparatus where a shutter is used having a larger number of gates and masking sectors, said shutter then rotating more slowly. It also extends to apparatus where the largest number of marks is used on the shutter in order to obtain a comparison with all the signals of the fields or with certain of the line signals in order to increase the control precision. Finally, it extends to apparatus where the coloured components of the video signal are separated in order to separately reproduce them on the film.

The invention also extends to apparatus in which the shutter is eliminated, whilst retaining the positioning marks fixed on the shaft of motor 110 and cooperating with detector 115. In this case, signals permitting the extinguishing the spot of the cathode ray tube are applied to television set 104 at times where in the sequence used an opaque sector masks the lens.

In the case of the sequence shown in FIG. 2, it is possible for this purpose to apply the signal arriving on connection TO to a bistable multivibrator making it possible to obtain a control signal every other image (read or reread). This control signal is then amplified to an appropriate level permitting the extinguishing of the spot on the cathode ray tube in a manner well known in the art.

For the sequence shown in FIG. 5 where it is necessary to extinguish this spot during one field at the end of each non-reread frame and during a complete frame at the end of each reread frame it is possible to use logic signals from counter 806 by using a combination of logic gates supplying the control signal. This combination is obtained in known manner in order to correspond for example to the following Boolean formula:

$$(2\cap\overline{3})\cup[(6\cup7)\cap\overline{7}]$$

What we claim is:

1. An apparatus for the transcription of frames divided into fields from a video disk onto a cinefilm, said apparatus comprising a videodisk reader for reading successive fields on said disk, a television set and a camera, wherein the camera has a shutter and a lens, means responsive to control signals for driving said shutter to mask and unmask the lens for durations equal to at least that of the reading of one field, each masking being followed by an unmasking thereof for a period equal to that of the reading of one frame and circuit means connected to said reader for producing control signals to cause advance of the film when the lens is masked, and to cause periodic rereading of at least two fields by the reader to correlate the television and cinematic standards of frames per second.

2. An apparatus according to claim 1, wherein masking of the lens occurs during durations equal to that of the reading of one frame followed by an unmasking thereof for the same period whereby the apparatus also comprises means for causing the synchronization of the start and finish of masking of the lens with the start and finish of reading of a frame and wherein said circuit means includes means for causing the transmission of a rereading control signal at the end of the first reading of three successive frames of a group of five frames.

3. An apparatus according to claim 2, wherein the synchronization means and the control signal transmission means comprise means permitting the extraction of the television signal from the synchronization pulses marking the end of the images, means permitting the phase comparison of the synchronization pulses and the marking pulses transmitted by the fixed detector under the action of the marks carried by the disk and the transmission of an error signal serving to change the shooting speed of the camera, a ring counter which can assume eight separate states by counting the synchronization pulses and means permitting the transmission of a rereading control signal during the appearance of states 1, 3 and 5 of the counter.

4. An apparatus according to claim 2, wherein the shutter has a rotary disk provided with an opaque sector and a transparent sector having the same dimensions, said disk being provided with marks permitting the marking in conjunction with a fixed detector of the transitions between the opaque sector and the transparent sector.

5. An apparatus according to claim 1, wherein said driving means includes means for causing a first masking of the lens for a given period equal to that of reading a field, followed by a first unmasking of the lens for a duration equal to two of said given periods, a second masking for a duration equal to two of said given periods, and then a second unmasking for a duration equal to two of said given periods, and means for causing the synchronization of the start and finish to each of the unmaskings of the lens with the start and finish of the reading of two consecutive fields and wherein said circuit means includes means for causing the transmission of a rereading control signal at the end of unmasking following masking by a period equal to that of the reading of a field.

* * * * *